US011863709B2

(12) United States Patent
Shirahatti et al.

(10) Patent No.: US 11,863,709 B2
(45) Date of Patent: Jan. 2, 2024

(54) PRIORITY CALLING USING CLOUD-BASED SIGNALING FOR VOLTE AND NON-CELLULAR CALLS

(71) Applicant: Apple Inc., Cupertino, CA (US)

(72) Inventors: Harsha Shirahatti, Santa Clara, CA (US); Sanjeevi Balasubramanian, San Jose, CA (US); Sriram Subramanian, Santa Clara, CA (US); Nischay Goel, San Jose, CA (US); Shiva Krishna Narra, San Jose, CA (US); Vijay Venkataraman, San Jose, CA (US); Stephen C. Schweizer, Mountain View, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 17/447,676

(22) Filed: Sep. 14, 2021

(65) Prior Publication Data

US 2022/0086282 A1 Mar. 17, 2022

Related U.S. Application Data

(60) Provisional application No. 63/078,758, filed on Sep. 15, 2020.

(51) Int. Cl.
*H04M 3/00* (2006.01)
*H04M 5/00* (2006.01)
(Continued)

(52) U.S. Cl.
CPC .......... *H04M 7/006* (2013.01); *H04L 51/224* (2022.05); *H04L 65/1101* (2022.05); *H04M 7/0006* (2013.01)

(58) Field of Classification Search
CPC ..... H04W 12/06; H04W 88/02; H04W 76/50; H04W 12/08; H04W 12/72; H04W 12/71; H04W 12/02; H04W 68/005; H04W 12/30; H04W 8/18; H04W 4/16; H04W 68/00; H04L 51/224; H04L 63/08; H04L 67/306; H04L 67/10; H04L 63/102; H04L 51/226; H04L 51/212; H04L 67/303; H04L 65/1096; H04M 1/663; H04M 1/72484;
(Continued)

(56) References Cited

U.S. PATENT DOCUMENTS

| | | | |
|---|---|---|---|
| 8,355,491 B1 * | 1/2013 | Butt | H04M 3/436 379/210.01 |
| 8,532,627 B1 * | 9/2013 | Nassimi | H04M 3/436 455/412.2 |
| 8,576,828 B1 * | 11/2013 | Massey, Jr. | H04M 3/436 455/420 |
| 11,258,746 B1 * | 2/2022 | Nadig | H04L 51/226 |
| 2005/0172026 A1 * | 8/2005 | Jeon | H04L 61/4535 709/228 |
| 2008/0096518 A1 * | 4/2008 | Mock | H04W 48/04 455/404.1 |

(Continued)

*Primary Examiner* — Kharye Pope
(74) *Attorney, Agent, or Firm* — DICKINSON WRIGHT RLLP

(57) ABSTRACT

This Application describes mechanisms to provide priority levels for call connection requests and/or messages from a sending device to a receiving device. The receiving device is configured to allow prioritized notification alerts for incoming call connection requests and/or for incoming messages from a sending device to override a silent or do not disturb mode for one or more contacts based on i) a priority level provided with the call connection request or message and ii) a priority setting for the sending device or a set of devices associated with a user of the sending device.

20 Claims, 10 Drawing Sheets

(51) Int. Cl.
*H04L 12/66* (2006.01)
*H04M 7/00* (2006.01)
*H04L 51/224* (2022.01)
*H04L 65/1101* (2022.01)

(58) Field of Classification Search
CPC ............ H04M 3/436; H04M 3/42059; H04M 1/72454; H04M 19/041; H04M 3/42187; H04M 1/72448; H04M 15/745; H04M 2203/2005; H04M 2203/6081; H04M 3/42051; H04M 3/4365; H04M 2201/42; H04M 2242/22; H04M 3/42093; H04M 7/0057; H04M 7/006
USPC ............ 379/142.06, 208.01, 373.01, 373.02, 379/142.01, 142.04, 142.05, 207.15, 379/207.16, 374.03, 376.02; 455/411, 455/567, 412.2, 432.3
See application file for complete search history.

(56) References Cited

U.S. PATENT DOCUMENTS

| | | | |
|---|---|---|---|
| 2008/0101224 A1* | 5/2008 | Khasnabish | H04L 45/125 370/395.42 |
| 2008/0318560 A1* | 12/2008 | Reifman | H04M 1/57 455/415 |
| 2009/0010406 A1* | 1/2009 | Miller | H04L 65/1069 379/93.23 |
| 2014/0277932 A1* | 9/2014 | Prakah-Asante | H04M 1/72484 701/36 |
| 2015/0256670 A1* | 9/2015 | Apt | H04M 19/041 379/201.01 |
| 2017/0195988 A1* | 7/2017 | Tumbi | H04W 68/02 |
| 2019/0020762 A1* | 1/2019 | Rose | H04M 3/537 |
| 2021/0076171 A1* | 3/2021 | George Philip | H04M 1/72457 |
| 2021/0136197 A1* | 5/2021 | Clay | H04M 3/4365 |

* cited by examiner

200

USER CALL PRIORITY SETTINGS

| Priority Contacts | |
|---|---|
| John | ⊙ |
| | |
| Jane | ⊙ |

| John Priority Notifications | |
|---|---|
| High Priority | ⊙ |
| Override Do Not Disturb | ⊙ |
| Select Ringtone | ⊙ |
| Select Vibration Pattern | ⊙ |
| | |
| Medium Priority | ⊙ |
| Override Do Not Disturb | ⊙ |
| Select Ringtone | ⊙ |
| Select Vibration Pattern | ⊙ |
| | |
| Low Priority | ⊙ |
| Override Do Not Disturb | ⊙ |
| Select Ringtone | ⊙ |
| Select Vibration Pattern | ⊙ |

*FIG. 2*

PRIORITY CALLING USING CLOUD-BASED SIGNALING FOR VoLTE AND NON-CELLULAR CALLS

CROSS-REFERENCE TO RELATED APPLICATIONS

The present application claims the benefit of U.S. Provisional Application No. 63/078,758, entitled "PRIORITY CALLING USING CLOUD-BASED SIGNALING FOR VoLTE AND NON-CELLULAR CALLS," filed Sep. 15, 2020, the content of which is incorporated herein by reference in its entirety for all purposes.

FIELD

The described embodiments relate to wireless communications, including methods and apparatus to support priority calling indications for Voice over Long Term Evolution (VoLTE) and non-cellular call connections between wireless devices. Priority indications can also be used for messaging applications.

BACKGROUND

Mobile wireless devices that support cellular and non-cellular call connections, including voice and video, as well as messaging capabilities, have become ubiquitous. With always available connectivity, however, as user can be disrupted, e.g., by spam calls or unwanted messaging. A user can customize ring tones and/or vibration alerts for incoming call connection requests and/or incoming messages for various contacts stored in contact list of the mobile wireless device. A sending user, however, cannot indicate, a priori, a priority or urgency for a given call connection request or message. Moreover, a receiving user can configure their mobile wireless device for a silent or do not disturb mode, which can silence all incoming call connection requests and messaging alerts while enabled. As all incoming call connection requests and messaging alerts are treated with equal priority presently, a receiving user can be unable to receive a prioritized call connection request or alert notification message in a timely manner. Presently, limited alerts from authorized governmental agencies are able to bypass user settings to provide audible and/or visual notification alerts. A known contact of a receiving user, however, cannot prioritize a call connection request or message to trigger a ringtone, vibration alert, or visual notification message when the receiving user sets a silent or do not disturb mode to be active. Mechanisms to overcome this deficiency are required.

SUMMARY

This Application describes mechanisms to provide priority levels for call connection requests and/or messages. Identification information for a sending mobile wireless device can be included in a contact list stored at a receiving mobile wireless device. A user of the receiving mobile wireless device can configure priority notifications for incoming call connection requests and/or for incoming messages to allow prioritized call connection requests or messages that have an appropriate priority level indication to override a silent or do not disturb mode for one or more contacts. In some embodiments, each contact in a contact list of the receiving mobile wireless device can be individually configured for prioritization of call connection requests and/or messages. In some embodiments, priority levels can be configured to override a silent or do not disturb mode, to cause a particular ringtone to be used, and/or to cause a particular vibration pattern to be used to indicate a priority level for an incoming call connection request and/or message. A user of the sending mobile wireless device, when the receiving mobile wireless device is appropriately configured to allow priority indications from the sending mobile wireless device, can select a priority level indication, e.g., a high priority level indication, a medium priority level indication, or a low (e.g., default) priority level indication to be sent with a call connection request (or with a message) to the receiving mobile wireless device. In some embodiments, the priority level indication is included with a call connection setup message, e.g., as part of an extension header of a Session Initiation Protocol (SIP) invite message. In some embodiments, the priority level indication is sent via a separate data connection established between the sending mobile wireless device and the receiving mobile wireless device. The sending mobile wireless device or a centralized server can i) identify an Internet Protocol (IP) address for the receiving mobile wireless device, ii) establish a parallel data connection between the sending mobile wireless device and the receiving mobile wireless device, and iii) communicate a selected priority indication for an incoming call connection request and/or message sent to the receiving mobile wireless device. The receiving mobile wireless device can override a silent or do not disturb mode based on i) the received priority level indication and ii) the priority level setting for the sending mobile wireless device maintained at the receiving mobile wireless device. When the priority level setting allows for audible, haptic, and/or visual alert notification for the incoming call connection request and/or message, an alert notification can be provided to the user of the receiving mobile wireless device. In some embodiments, priority indications can be provided between two computing devices that each use an operating system of a common original equipment manufacturer (OEM), e.g., between computing devices manufactured by Apple Inc and configured with iOS, macOS®, and/or iPadOS®.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

FIG. 2 illustrates an exemplary user interface screen for setting priority level alert notification preferences for call connection requests or messages from a mobile wireless device, according to some embodiments.

DETAILED DESCRIPTION

Figure 1:
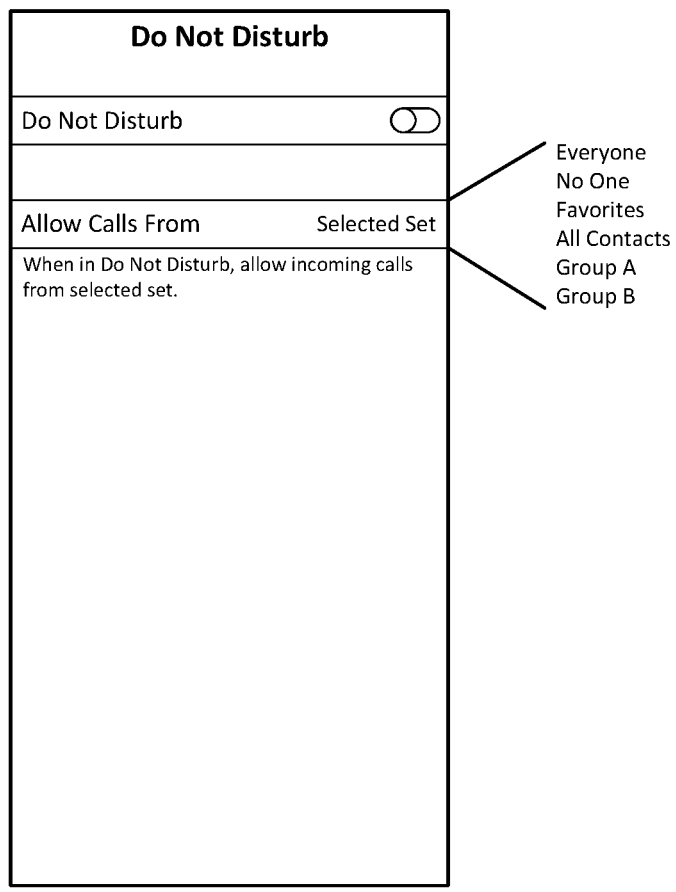
FIG. 1 illustrates an exemplary user interface screen for setting user preferences for a silent or do not disturb mode of a mobile wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Cellular wireless capabilities continue to be incorporated into a broad array of electronic devices, including mobile phones, tablets, portable computers, wearable devices, automobiles, etc. With ubiquitous connectivity available, a user of a mobile wireless device can configure the mobile wireless device to allow or disallow audible, haptic, and/or visual alert notifications to control when incoming call requests and/or messages occur. When alert notifications are disallowed, such as when setting a silent or do not disturb mode, a user of the mobile wireless device can allow for particular sending mobile wireless devices to override the silent or do not disturb mode and provide an alert notification based on a priority level indication provided for the incoming call notification and/or message. Identification information for a sending mobile wireless device can be included in a contact list stored at a receiving mobile wireless device. A user of the receiving mobile wireless device can configure priority notifications for incoming call connection requests and/or for incoming messages to allow prioritized call connection requests or messages that have an appropriate priority level indication to override the silent or do not disturb mode for one or more contacts. In some embodiments, each contact in a contact list of the receiving mobile wireless device can be individually configured for prioritization of call connection requests and/or messages. In some embodiments, priority levels can be configured to override a silent or do not disturb mode, to cause a particular ringtone to be used, and/or to cause a particular vibration pattern to be used to indicate a priority level for an incoming call connection request and/or message. A user of the sending mobile wireless device, when the receiving mobile wireless device is appropriately configured to allow priority indications from the sending mobile wireless device, can select a priority level indication, e.g., a high priority level indication, a medium priority level indication, or a low (e.g., default) priority level indication to be sent with a call connection request (or with a message) to the receiving mobile wireless device. The priority level selected by the user of the sending mobile wireless device can provide an indication of an urgency for the incoming call connection request and/or message to be delivered to the user of the receiving mobile wireless device. In some embodiments, the priority level indication is included with a call connection setup message, e.g., as one or more encoded bits as part of an extension header of a Session Initiation Protocol (SIP) invite message. In some embodiments, the priority level indication is sent as one or more bits encapsulated in a data packet via a separate data connection established between the sending mobile wireless device and the receiving mobile wireless device. The sending mobile wireless device or a centralized server can i) identify an Internet Protocol (IP) address for the receiving mobile wireless device, ii) establish a parallel data connection between the sending mobile wireless device and the receiving mobile wireless device, and iii) communicate a selected priority indication for an incoming call connection request and/or message sent to the receiving mobile wireless device. In some embodiments, the centralized server is a push notification server managed by an original equipment manufacturer of the sending and receiving mobile wireless devices. The receiving mobile wireless device can override a silent or do not disturb mode based on i) the received priority level indication and ii) the priority level setting for the sending mobile wireless device maintained at the receiving mobile wireless device. When the priority level setting allows for audible, haptic, and/or visual alert notification for the incoming call connection request and/or message, an alert notification can be provided to the user of the receiving mobile wireless device. Priority indications can be used for cellular call connections, e.g., for Voice over Long Term Evolution (VoLTE), Voice over New Radio (VoNR), or Voice or Internet Protocol (VoIP) call connections, for non-cellular call connections, e.g., for FaceTime® audio or video calls, for cellular data messaging services, e.g., for a short message service (SMS) message, and/or for instant messaging application services, e.g., for iMessage® messages, Whatsapp messages, or the like. In some embodiments, priority indications can be provided between two computing devices that each use an operating system of a common original equipment manufacturer (OEM), e.g., between computing devices manufactured by Apple Inc and configured with iOS, MacOS, and/or iPadOS. A user interface of the computing device can provide options for priority selection by a user of the sending computing device when initiating a call connection request and/or when sending a message to a receiving computing device that allows for priority call notification and messaging. In some embodiments, information regarding configuration of the receiving computing device can be provided to the sending computing device via a cloud-based service, e.g., via iCloud®.

These and other embodiments are discussed below with reference to FIGS. 1 through 6; however, those skilled in the art will readily appreciate that the detailed description given herein with respect to these figures is for explanatory purposes only and should not be construed as limiting.

FIG. 1 illustrates a diagram 100 of an exemplary user interface screen for setting user preferences for a silent or do not disturb mode of a mobile wireless device. A user of the mobile wireless device can select a radio button to enable a do not disturb mode to silence incoming call connection and message alert notifications. In some embodiments, the user can select when the incoming call connection and message alert notifications will be silenced, such as while in a particular state (e.g., locked display, while moving in a vehicle, etc.) or independent of a particular state (e.g., always). In some embodiments, the user can select a set of contacts for which incoming call connection alert notifications can override the silent or do not disturb setting. In some embodiments, the user preferences settings illustrated in FIG. 1, can apply to all call connection requests of any priority level.

FIG. 2 illustrates a diagram 200 of an exemplary user interface screen for setting priority level notification alert preferences to allow selected call connection requests and/or messages of a particular priority level to override the silent or do not disturb mode of the mobile wireless device. To allow for a finer granularity of do not disturb settings (compared with the settings of FIG. 1 alone), a user of the mobile wireless device can establish individual priority notification settings for one or more contacts stored in a contact list of the mobile wireless device. In some embodiments, the user of the mobile wireless device selects one or more contacts as priority contacts for which priority notifications can be configured. Priority contacts can be individuals or groups of individuals listed in the list of contacts for the mobile wireless device. When a priority level is enabled for a priority contact, one or more sending computing devices, e.g., a sending mobile wireless device and/or computer associated with the priority contact can be allowed to select an enabled priority level indication for a call connection request or message and override a silent or do not disturb mode of the receiving mobile wireless device. Sending computing devices can be identified based on a caller identification value, such as a mobile subscriber international services digital number (MSISDN), also referred to a phone number, or an email address included with the call connection request and/or message sent to the receiving device (which can be a mobile wireless device or a computer). For each priority contact selected, the user of the mobile wireless device can select whether particular priority level indications for incoming call connection requests and/or for messages can cause an override of a silent or do not disturb setting to provide an audible, haptic, and/or visual alert notifications for the incoming call connection requests and/or messages from the priority contact. For each priority level selected for overriding the silent or do not disturb mode, the user of the mobile wireless device can optionally select a particular ringtone and/or a particular vibration pattern to be used to provide an audible or haptic alert for an incoming call connection and/or message notification alert that has an indication of the priority level. In some embodiments, when a particular priority level, e.g., a medium priority level, is selected for a particular priority contact to allow for overriding the silent or do not disturb setting, an incoming call connection request that has the particular priority level can result in an audible, haptic, and/or visual alert notification at the receiving mobile wireless device. An indication of the particular priority level can be sent by the sending mobile wireless device to the receiving mobile wireless device as part of the incoming call connection request, e.g., embedded in an extension header of a SIP invite message, or as a separate message via a separate data connection established between the sending mobile wireless device and the receiving mobile wireless device. In some embodiments, when a particular priority level, e.g., a medium priority level, is selected for a particular priority contact to allow for overriding the silent or do not disturb setting, an incoming call connection request that has the particular priority level or a higher priority level, e.g., a high priority level, can result in an audible, haptic, and/or visual alert notification at the receiving mobile wireless device, while an incoming call connection request that has a lower priority level, e.g., a low priority level, can continue to be blocked by the silent or do not disturb mode and therefore not result in an audible, haptic, or visual alert notification. Thus, in some embodiments, each individual priority level can be individually controlled for overriding the silent or do not disturb mode, selection of a particular audible ringtone, and selection of a particular haptic vibration pattern; while, in some embodiments, with a particular priority level selected for overriding the silent or do not disturb mode for a priority contact, any incoming call connection request at the particular priority level and one or more higher priority levels will override the silent or do not disturb mode and provide an audible, haptic, and/or visual alert notification. In some embodiments, priority settings can be allowed to override a silent or do not disturb mode based on priority level indications for incoming call connections associated with a particular sending mobile wireless device and also based on a particular application to be used for the incoming call connection. For example, in some embodiments, a priority setting can allow override of the silent or do not disturb mode for an incoming FaceTime audio or video call connection request but disallow override for a cellular network call connection request. In some embodiments, configuring a priority contact for alert notifications can apply to a particular device or to a set of particular devices of the priority contact. In some embodiments, configuration of a priority contact at a user's device can propagate and be applied to additional devices of the user that share a common user account, e.g., a common cloud-based service account, such as an iCloud account. A user can configure priority level indications to apply to: i) a particular sending device of a priority contact, ii) any sending device of a set of devices of a priority contact, iii) a particular receiving device of the user, and/or iv) a set of receiving devices of the user.

Figure 3:
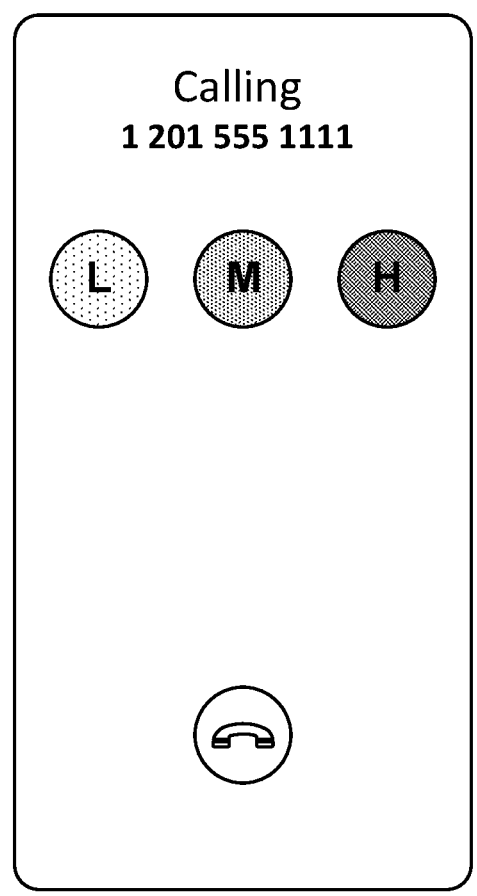
FIG. 3 illustrates an exemplary user interface screen to select a priority level for a call connection request from a sending mobile wireless device, according to some embodiments.

FIG. 3 illustrates a diagram 300 of an exemplary user interface screen to select a priority level for a call connection request by a user of a sending mobile wireless device. When a user of the receiving mobile wireless device allows for priority level indications for call connection requests and/or messages from a user of the sending mobile wireless device, e.g., based on user priority settings as described for FIG. 2, the user interface at the sending mobile wireless device can display options for priority level indications based on the user priority settings provided by the user of the receiving mobile wireless device. In some embodiments, when a user of the sending mobile wireless device is enabled as a priority contact, options for setting a priority level indication for a call connection request (or when sending a message via a messaging application) can be presented via the user interface of the sending mobile wireless device. In some embodiments, a range of available priority level indications, e.g., low, medium, and/or high, can be presented via the user interface of the sending mobile wireless device, when establishing a call connection or when sending a message to the receiving mobile wireless device. In some embodiments, an indication via the user interface of the sending mobile wireless device can show which priority level is selected. In some embodiments, a low (default) priority level can be automatically selected for a call connection request or message unless a user of the sending mobile wireless device selects a different, higher priority level for the call connection request or message. In some embodiments, a priority bit (or set of bits) can be included in a header (or other applicable field) of a packet when initiating a call connection request. For example, an extension header of a SIP invite message can include one or more bits to indicate a priority level for a call connection request. In some embodiments, options for priority level selection of a call connection request or message are only displayed when the user of the sending mobile wireless device is included as a priority contact in a configuration of the receiving mobile wireless device. In some embodiments, a medium priority level indication can allow for changing an audible ringtone, a haptic, vibration pattern, and/or a visual indication for a call connection request or message notification alert at the receiving mobile wireless device but leave the silent or do not disturb mode restrictions unchanged. For example, in some embodiments, a priority contact can cause the audible, haptic, and/or visual notification alert to have a different effect at the receiving mobile wireless device when using a medium priority level indication rather than a low (default) priority level indication, and the different effect will occur when the receiving mobile wireless device has the silent or do not disturb mode disabled (not active), while no change will occur when the silent or do not disturb mode is enabled (active). In some embodiments, a high priority level indication can change an audible ringtone, a haptic, vibration pattern, and/or a visual indication for a call connection request or message notification alert at the receiving mobile wireless device independent of a silent or do not disturb mode setting, i.e., can override the silent or do not disturb mode setting of the receiving mobile wireless device. In some embodiments, a particular ring tone can be used, a particular haptic, vibration pattern can be used, a particular visual indication, such as a screen color change, can be used for an incoming call connection request with the high priority level indication. In some embodiments, options to change a priority level indication for a message can be presented when a user of the sending mobile wireless device uses a long press on a selected message via the user interface to send to the receiving mobile wireless device. Priority level indications can be presented, in some embodiments, only when the sending mobile wireless device is included as a priority contact in a configuration of the receiving mobile wireless device.

Figure 4A:
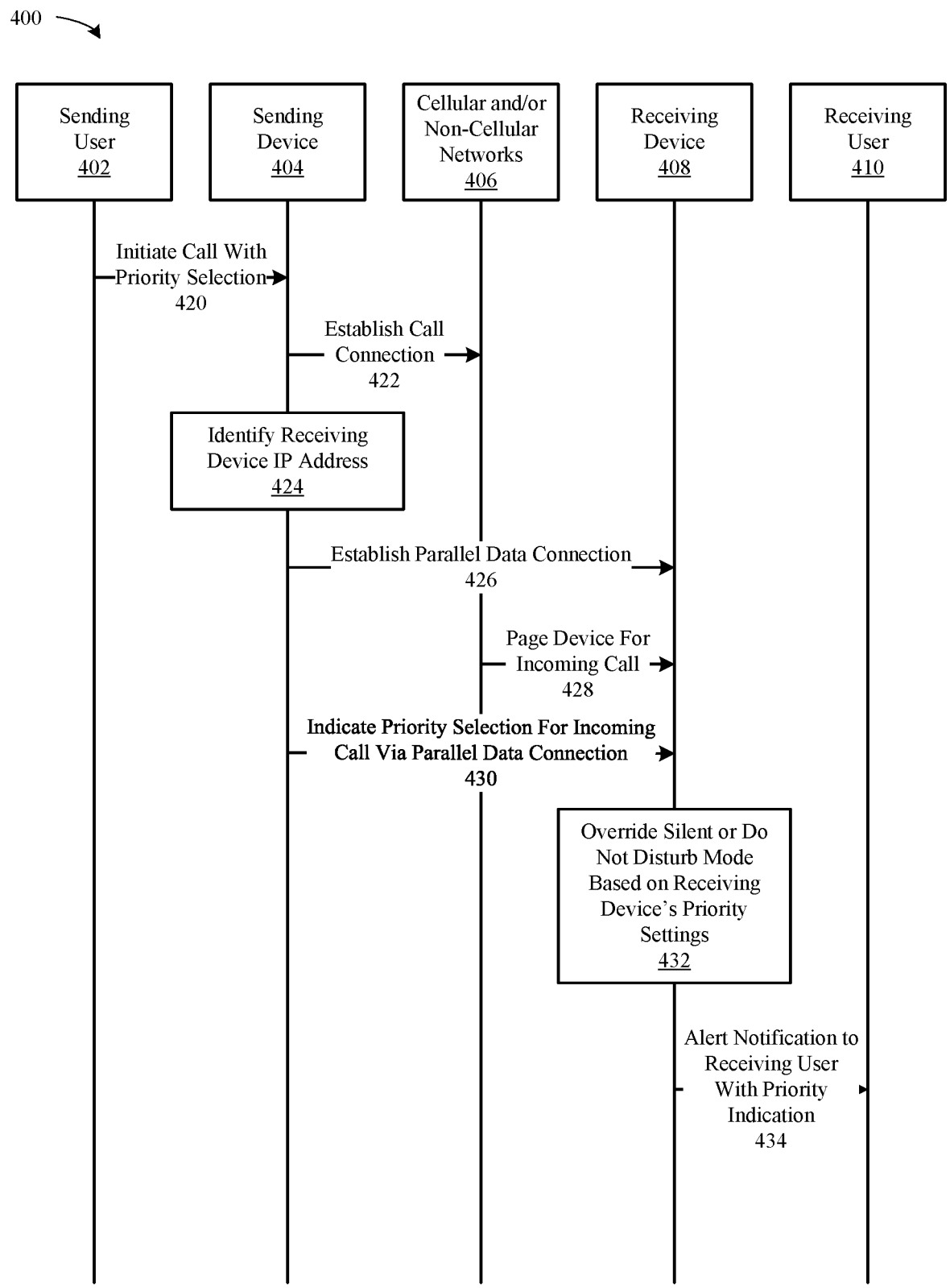
FIGS. 4A and 4B illustrates exemplary sets of actions to cause a priority level indication to override a silent or do not disturb mode at a receiving device for a call connection request from a sending device, according to some embodiments.

FIG. 4A illustrates a diagram 400 of an exemplary sequence of actions to cause a priority level indication to override a silent or do not disturb mode at a receiving device 408. The receiving device 408 can be a mobile wireless device or another computing device, such as a wired or wirelessly connected computer. The sending device 404 can also be a mobile wireless device or another computing device. A receiving user 410 of the receiving device 408 can have previously configured the sending device 404 as a priority contact to allow for priority level indications to cause alert notifications to occur at the receiving device 408 for call connection requests and/or for messages received, including when the receiving device 408 is configured with a silent or do not disturb mode enabled (active). At 420, the sending user 402 can initiate a call connection request for a voice or video call by interacting with the sending device 404, e.g., via a user interface or via another input, such as via an audio command. As the sending device 404 of the sending user 402 is marked as a priority contact by the receiving device 408, the sending user can be presented with options for a priority level indication to be sent with the call connection request or message sent to the receiving device 408. At 420, the sending user 402 can select a priority level indication, and the sending device 404, at 422, can send a call connection request to a cellular network and/or to a non-cellular network to establish a voice or video call connection with the receiving device 408. The sending device, at 424, can identify an IP address for the receiving device 408, and at 426, establish a parallel data connection via a cellular network and/or a non-cellular network with the receiving device 408. In some embodiments, the IP address for the receiving device 408 can be identified by the sending device 404 using a cloud-based service identifier, e.g., an iCloud® link, or via a query to a centralized network server or via another applicable lookup method. At 428, the cellular and/or non-cellular networks 406 can page the receiving device 408 to indicate an incoming call connection request. In parallel, at 430, via the data connection, the sending device 404 can provide to the receiving device 408, a priority level indication selected by the sending user 402 for the incoming call connection request sent to the receiving device 408. In some embodiments, the priority level indication is communicated via a dedicated bearer having a high (or higher) quality of service level when available to ensure the priority level indication is received at the receiving device 408 in a timely manner. At 432, the receiving device 408, after receipt of both the page and the priority level indication for the incoming call connection request, can override a silent or do not disturb mode based on priority settings at the receiving device 408 for the sending device 404 (or for one or more devices of the sending user 402 including the sending device 404) and on the priority level indication. At 434, the receiving user 410 of the receiving device 408 can be provided by the receiving device 408 an alert notification with a priority level indication. In some embodiments, characteristics of the alert notification, e.g., a particular ringtone, a particular haptic, vibration patter, and/or a visual indication can be based on settings for the sending device 404 (or for the sending user 402) previously configured by the receiving user 410.

Figure 4B:
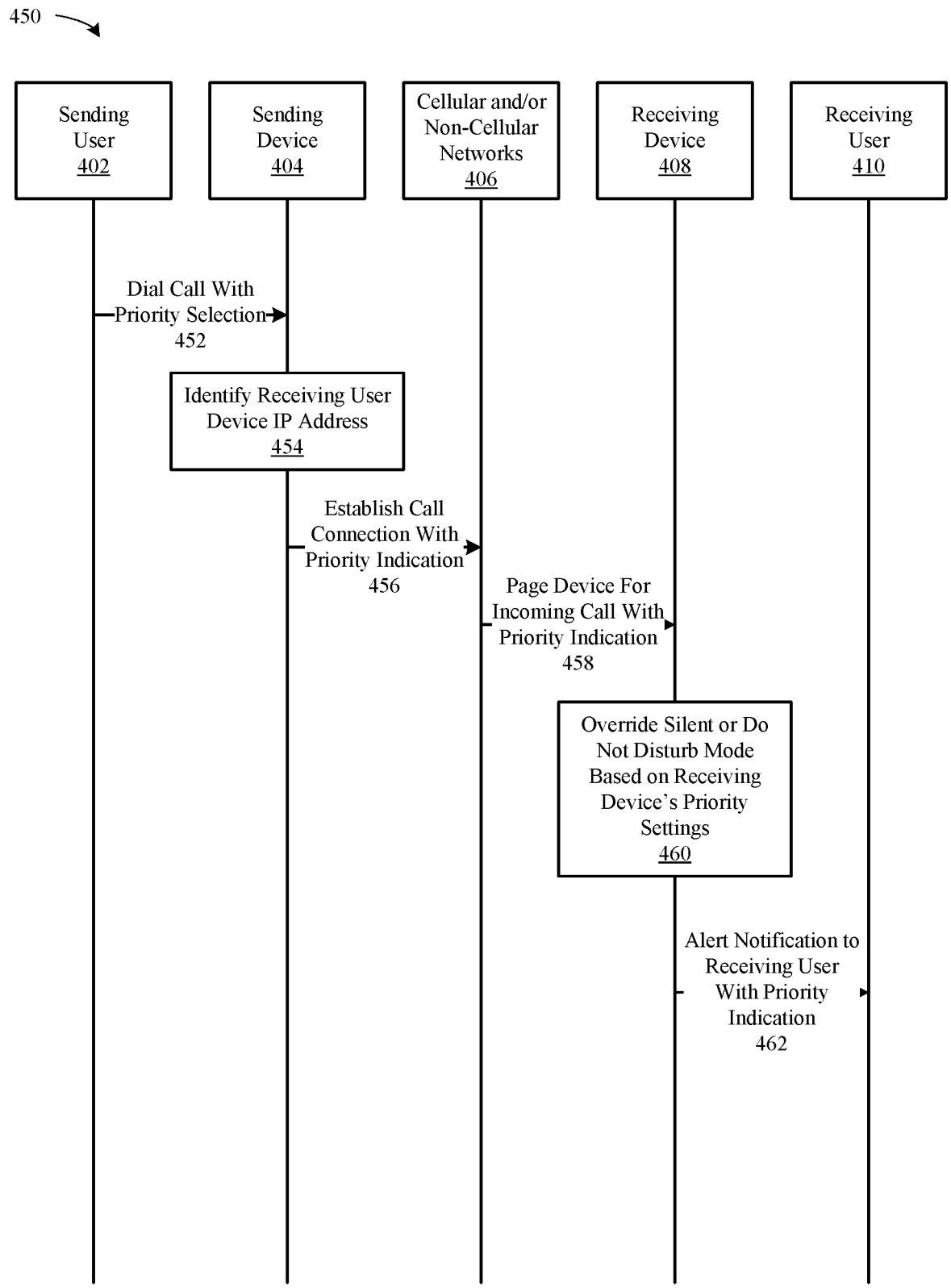

FIG. 4B illustrates a diagram 450 of another exemplary sequence of actions to cause a priority level indication to override a silent or do not disturb mode at a receiving device 408. The receiving device 408 can be a mobile wireless device or another computing device, such as a wired or wirelessly connected computer. The sending device 404 can also be a mobile wireless device or another computing device. A receiving user 410 of the receiving device 408 can have previously configured the sending device 404 as a priority contact to allow for priority level indications to cause alert notifications to occur at the receiving device 408 for call connection requests and/or for messages received, including when the receiving device 408 is configured with a silent or do not disturb mode enabled (active). At 452, the sending user 402 can initiate a call connection request for a voice or video call by interacting with the sending device 404, e.g., via a user interface or via another input, such as via an audio command. As the sending device 404 of the sending user 402 is marked as a priority contact by the receiving device 408, the sending user can be presented with options for a priority level indication to be sent with the call connection request or message sent to the receiving device 408. At 452, the sending user 402 can select a priority level indication, and, at 454, the sending device, at 454, can identify an IP address for the receiving device 408. In some embodiments, the IP address for the receiving device 408 can be identified by the sending device 404 using a cloud-based service identifier, e.g., an iCloud® link, or via query to a centralized network server or via another applicable lookup method. At 456, the sending device 404 can send a call connection request to a cellular network and/or to a non-cellular network to establish a voice or video call connection with the receiving device 408. In some embodiments, the call connection request can include one or more bits to indicate a priority level for the call connection request, e.g., as part of a SIP Invite message. In some embodiments, the bits that indicate a priority level can be part of a proprietary protocol for communication between the sending device 404 and the receiving device 408. In some embodiments, the bits can be included in a header of a packet message sent to the receiving device 408 to request establishment of the incoming call connection. At 458, the cellular and/or non-cellular networks 406 can page the receiving device 408 to indicate an incoming call connection request, where the page can include an embedded priority level indication. The receiving device 408 can receive the page and can extract the embedded priority level indication. At 460, the receiving device 408, can override a silent or do not disturb mode based on priority level settings at the receiving device 408 for the sending device 404 (or for one or more devices of the sending user 402 including the sending device 404) and on the priority level indication. At 462, the receiving user 410 of the receiving device 408 can be provided by the receiving device 408 an alert notification with a priority level indication. In some embodiments, characteristics of the alert notification, e.g., a particular ringtone, a particular haptic, vibration patter, and/or a visual indication can be based on settings for the sending device 404 (or for the sending user 402) previously configured by the receiving user 410.

Figure 5A:
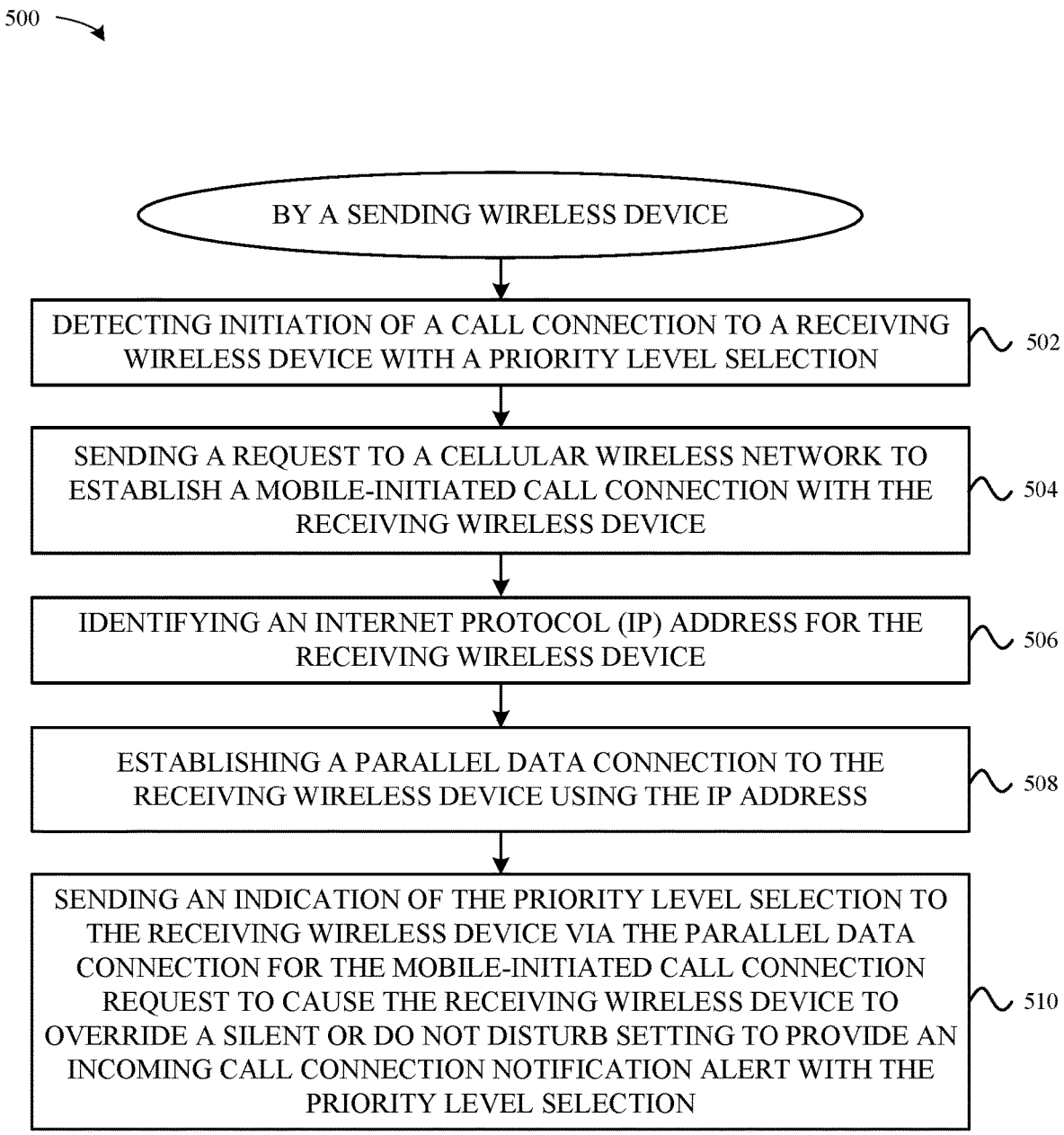
FIGS. 5A, 5B, 5C, and 5D illustrate flowcharts of exemplary sets of actions to cause a priority level indication to override a silent or do not disturb mode at a receiving device for a call connection request from a sending device, according to some embodiments.

FIG. 5A illustrates a flowchart 500 of an exemplary method for providing a priority level indication by a sending wireless device to a receiving wireless device in conjunction with a call connection request. At 502, the sending wireless device detects initiation of a call connection to the receiving wireless device, where a user of the sending wireless device selects a priority level to be provided with the call connection request to the receiving wireless device. At 504, the sending wireless device sends a request to a cellular wireless network to establish a mobile-initiated call connection with the receiving wireless device. At 506, the sending wireless device obtains an internet protocol (IP) address for the receiving wireless device, e.g., via an applicable lookup method such as an internal database record, an external database query, a query to a centralized network server, a query to a cloud-based service, or the like. At 508, the sending wireless device establishes a parallel data connection between the sending wireless device and the receiving wireless device using the IP address. At 510, the sending wireless device sends an indication of the priority level selection to the receiving wireless device, via the parallel data connection, for the mobile-initiated call connection request to cause the receiving wireless device to override a silent or do not disturb setting to provide an incoming call connection notification alert with the priority level selection. Override of the silent or do not disturb setting of the receiving wireless device can be based on a priority contact configuration at the receiving wireless device for the sending wireless device (or for one or more devices of a user of the sending wireless device).

Figure 5B:
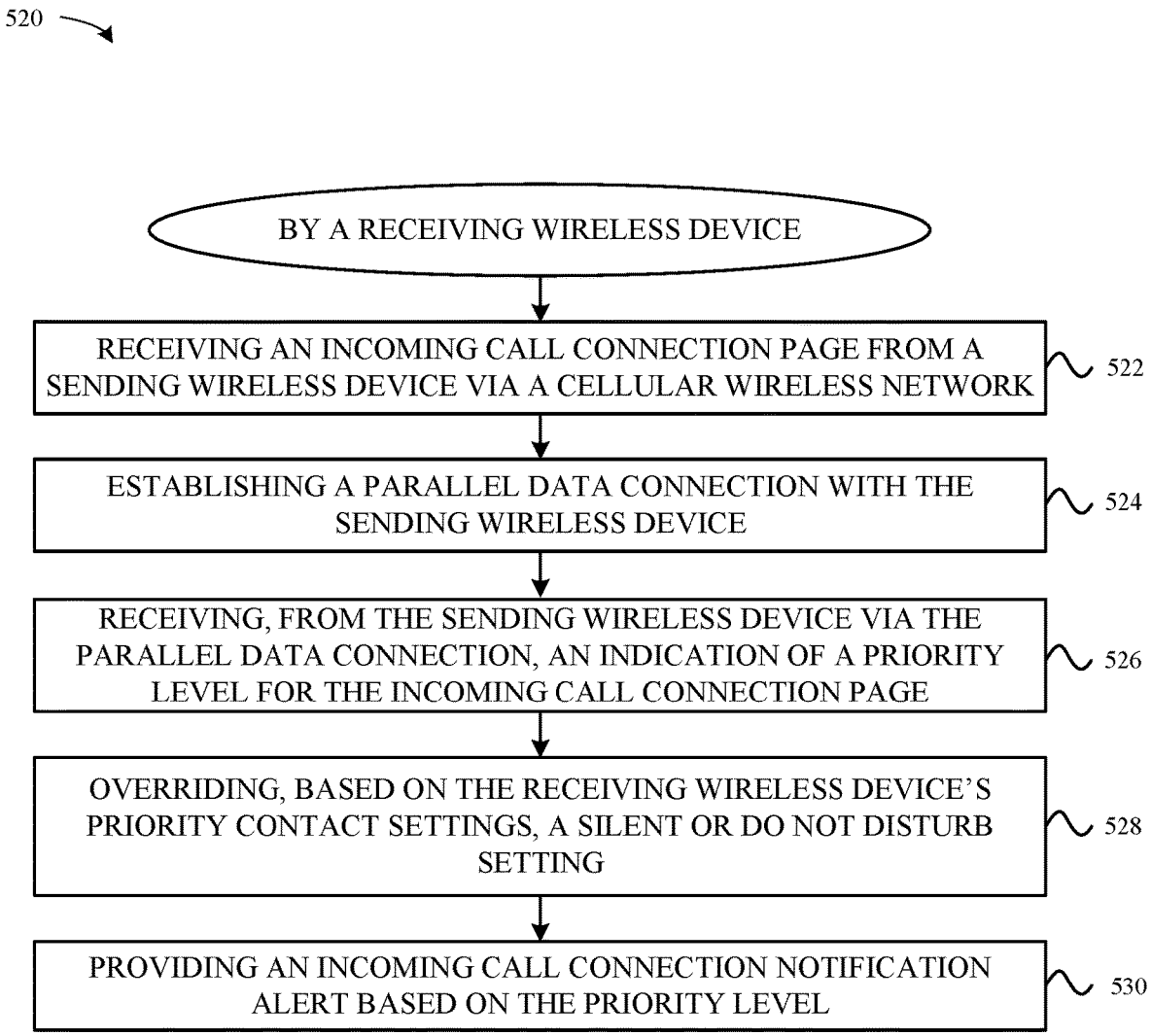

FIG. 5B illustrates a flowchart 520 of an exemplary method for receiving a priority level indication from a sending wireless device by a receiving wireless device in conjunction with a call connection request. At 522, the receiving wireless device receives an incoming call connection page from the sending wireless device via a cellular wireless network. At 524, the receiving wireless device establishes a parallel data connection with the sending wireless device. At 526, the receiving wireless device receives, from the sending wireless device via the parallel data connection, an indication of a priority level selected by the sending wireless device for the incoming call connection page. At 528, the receiving wireless device overrides a silent or do not disturb mode based on the receiving wireless device's priority contact settings for the sending wireless device (or for one or more devices of a user of the sending wireless device). At 530, the receiving wireless device provides an incoming call connection alert notification based on the priority level. In some embodiments, an audible alert notification, e.g., a particular ringtone, a haptic notification alert, e.g., a particular vibration pattern, and/or a visual alert notification, e.g., a particular color or icon can be presented to alert a user of the receiving wireless device of the incoming call connection request and an associated priority level selected by the sending wireless device to emphasize urgency of the incoming call connection request.

Figure 5C:
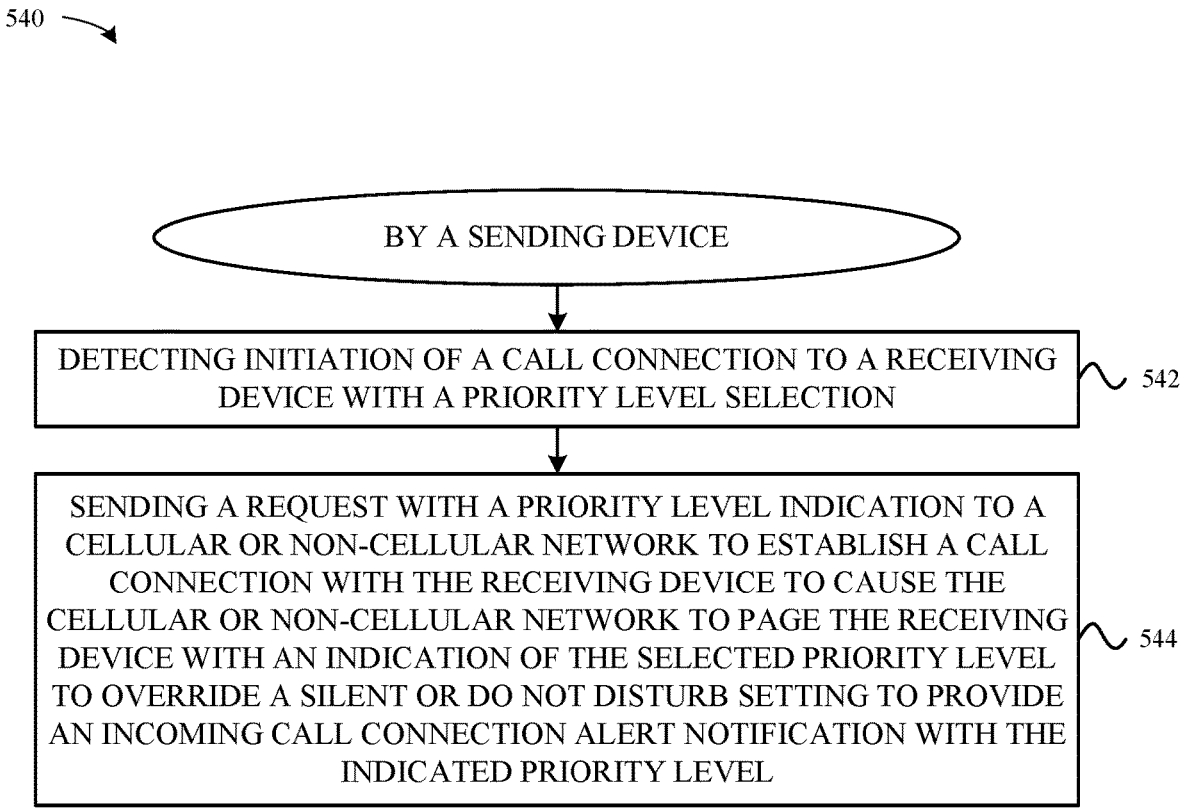

FIG. 5C illustrates a flowchart 540 of an exemplary method for providing a priority level indication by a sending device to a receiving device in conjunction with a call connection request. At 542, the sending device detects initiation of a call connection to a receiving device with a selected priority level. At 544, the sending device sends a request that includes an indication of the selected priority level to establish a call connection with the receiving device via a cellular network or via a non-cellular network. The request causes the cellular network or the non-cellular network to page the receiving device with an indication of the selected priority level to cause the receiving device to override a silent or do not disturb mode to provide an incoming call connection alert notification with the indicated priority level. In some embodiments, the priority level indication is included as a set of one or more bits in a packet to establish the call connection with the receiving device.

Figure 5D:
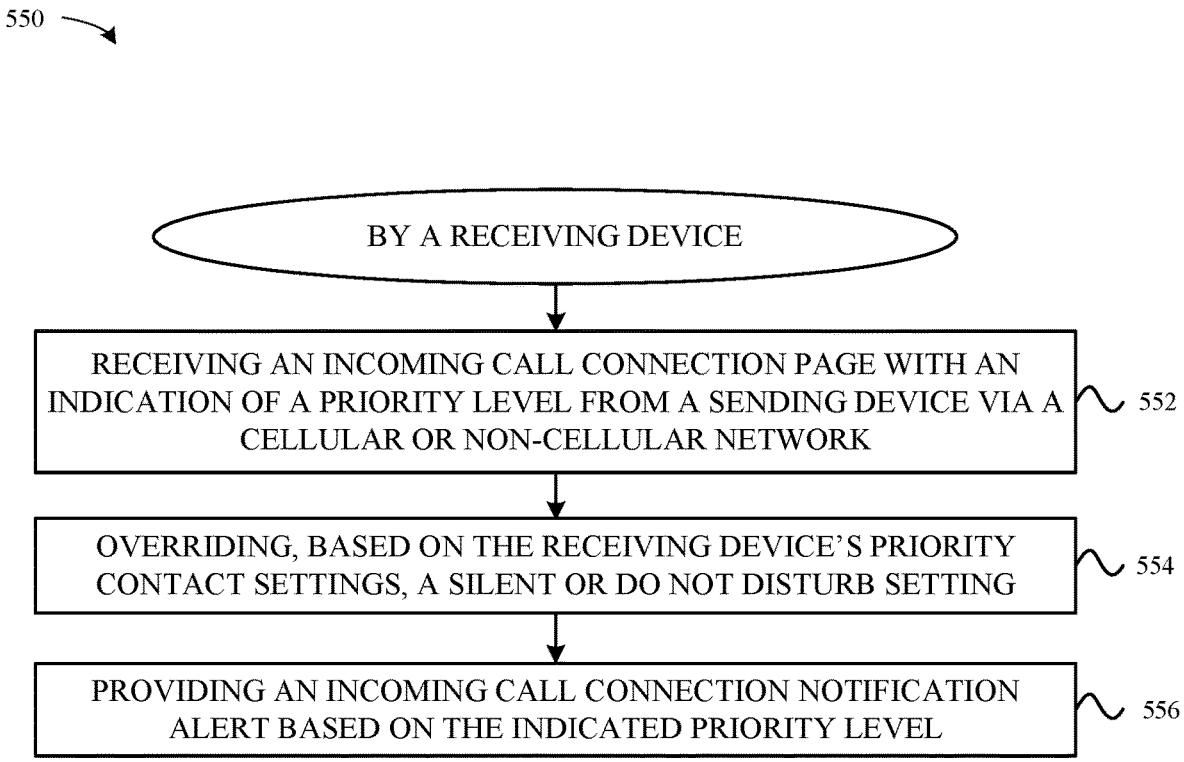

FIG. 5D illustrates a flowchart 550 of an exemplary method for receiving a priority level indication from a sending device by a receiving device in conjunction with a call connection request. At 552, the receiving device receives an incoming call connection page that includes an indication of a priority level from a sending device via a cellular network or via a non-cellular network. At 554, the receiving device overrides a silent or do not disturb setting based on the receiving device's priority contact settings. At 556, the receiving device provides an incoming call connection notification alert based on the indicated priority level. In some embodiments, the receiving device correlates an identifier for the sending device with a priority contact setting for the sending device (or for a set of devices associated with a user of the sending device) to determine whether to override the silent or do not disturb mode. In some embodiments, the priority contact setting includes a particular audible notification alert, e.g., a particular ringtone, a particular haptic notification alert, e.g., a particular vibration pattern, and/or a particular visual notification alert, e.g., a particular color or icon, based on the indicated priority level.

Representative Embodiments

In some embodiments, a method for providing a priority level indication with a call connection request to receiving wireless device includes a sending wireless device: i) method for providing a priority level indication with a call connection request to receiving wireless device; ii) sending, to a cellular wireless network, a request to establish a mobile-initiated call connection with the receiving wireless device; iii) obtaining an internet protocol (IP) address for the receiving wireless device; iv) establishing a parallel data connection between; and v) sending, to the receiving wireless device via the parallel data connection, an indication of the selected priority level for the request to establish the mobile-initiated call connection, where the selected priority level causes the receiving wireless device to override a silent or do not disturb setting to provide an incoming call connection notification alert with the selected priority level.

In some embodiments, the IP address is obtained by the receiving wireless device from a centralized server. In some embodiments, the centralized server includes a push notification server managed by an original equipment manufacturer of the sending wireless device and the receiving wireless device. In some embodiments, the method further includes the sending wireless device displaying options for the priority level selection based at least in part on a configuration for priority notifications for one or more contacts of a contact list stored at the sending wireless device. In some embodiments, the configuration for priority notifications for a contact associated with the receiving wireless device is provided by the receiving wireless device via a network-based server. In some embodiments, the configuration for priority notifications for the contact associated with the receiving wireless device is based at least in part on a priority contact setting for the sending wireless device or an associated contact thereof maintained by the receiving wireless device. In some embodiments, the indication of the priority level is included in an extension header of a Session Initiation Protocol (SIP) invite message. In some embodiments, the incoming call connection notification alert includes one or more of: an audible ringtone, a vibration pattern, or a visual alert indication. In some embodiments, the incoming call connection notification alert comprises one or more of the following selected by a user of the receiving wireless device: a particular audible ringtone, a particular vibration pattern, or a particular visual alert indication.

In some embodiments, a method for receiving a priority level indication with a call connection request from a sending wireless device includes a receiving wireless device: i) receiving an incoming call connection page from the sending wireless device via a cellular wireless network; ii) establishing a parallel data connection between the sending wireless device and the receiving wireless device; iii) receiving, from the sending wireless device via the parallel data connection, an indication of a priority level for the incoming call connection page; iv) overriding, based on a priority contact setting for the sending wireless device or a user thereof, a silent or do not disturb setting; and v) providing an incoming call connection notification alert based on the priority level.

In some embodiments, the parallel data connection is established between the sending wireless device and the receiving device based at least in part on assistance provided by a centralized server. In some embodiments, the centralized server includes a push notification server managed by an original equipment manufacturer of the sending wireless device and the receiving wireless device. In some embodiments, the method further includes the receiving wireless device obtaining, via an input/output of the receiving wireless device, the priority contact setting for the sending wireless device or the user thereof. In some embodiments, the priority contact setting establishes whether incoming call connection requests and/or messages received from the sending wireless device and having a particular indication of priority level can override the silent or do not disturb mode of the receiving wireless device. In some embodiments, information associated with the priority contact setting for the sending wireless device or the user thereof is provided to the sending wireless device before receipt of the incoming call connection page. In some embodiments, the information associated with the priority contact setting is provided via a network-based server to the sending wireless device. In some embodiments, the information associated with the priority contact setting determines at least in part whether options for selection of a priority level are displayed at the sending wireless device when attempting to establish a connection with the receiving wireless device. In some embodiments, the indication of the priority level is included in an extension header of a Session Initiation Protocol (SIP) invite message. In some embodiments, the incoming call connection notification alert includes one or more of: an audible ringtone, a vibration pattern, or a visual alert indication. In some embodiments, the incoming call connection notification alert includes one or more of the following selected by a user of the receiving wireless device: a particular audible ringtone, a particular vibration pattern, or a particular visual alert indication.

In some embodiments, a sending wireless device includes: i) wireless circuitry including one or more antennas; and ii) one or more processors communicatively coupled to the wireless circuitry and to a memory storing instructions that, when executed by the one or more processors, cause the sending wireless device to perform a method including any combination of actions as described herein.

In some embodiments, a receiving wireless device includes: i) wireless circuitry including one or more antennas; and ii) one or more processors communicatively coupled to the wireless circuitry and to a memory storing instructions that, when executed by the one or more processors, cause the sending wireless device to perform a method including any combination of actions as described herein.

Representative Exemplary Apparatus

Figure 6:
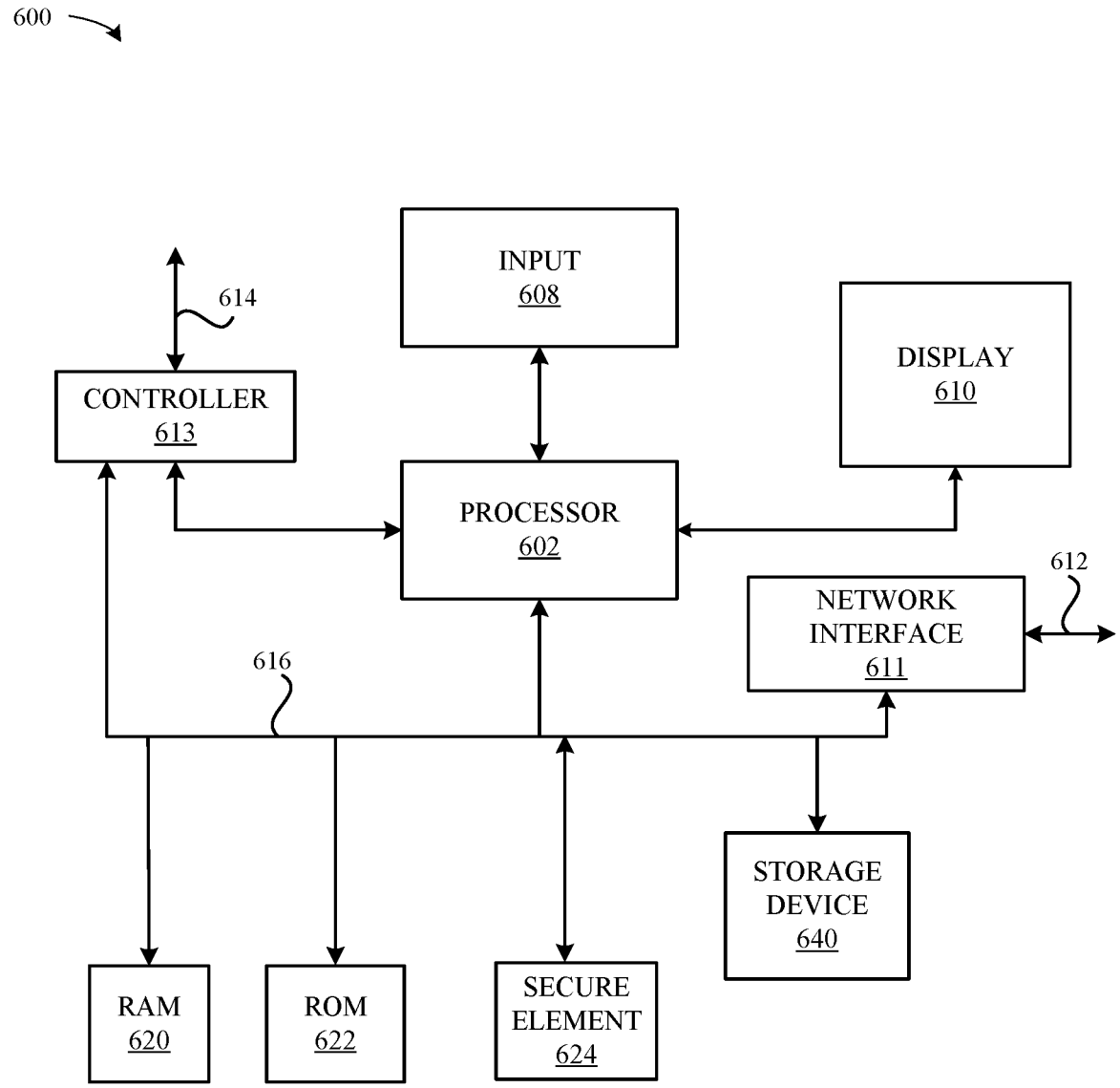
FIG. 6 illustrates a block diagram of exemplary elements of a mobile wireless device, according to some embodiments.

FIG. 6 illustrates in block diagram format an exemplary computing device 600 that can be used to implement the various components and techniques described herein, according to some embodiments. In particular, the detailed view of the exemplary computing device 600 illustrates various components that can be included in the sending mobile wireless device and/or a receiving mobile wireless device. As shown in FIG. 6, the computing device 600 can include one or more processors 602 that represent one or more microprocessors or controllers for controlling the overall operation of computing device 600. In some embodiments, the computing device 600 can also include a user input device 608 that allows a user of the computing device 600 to interact with the computing device 600. For example, in some embodiments, the user input device 608 can take a variety of forms, such as a button, keypad, dial, touch screen, audio input interface, visual/image capture input interface, input in the form of sensor data, etc. In some embodiments, the computing device 600 can include a display 610 (screen display) that can be controlled by the one or more processors 602 to display information to the user (for example, information relating to an ongoing process, such as during initial setup or restoration of the computing device 600). A data bus 616 can facilitate data transfer between at least a storage device 640, the one or more processors 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include wireless circuitry, such as a wireless transceiver and/or a baseband processor, that can be used to communicate with one or more cellular wireless networks and/or with non-cellular wireless networks. The computing device 600 can also include a secure element 624. The secure element 624 can include an eUICC and/or UICC.

The computing device 600 also includes a storage device 640, which can include a single storage or a plurality of storages (e.g., hard drives, memory modules), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A sending wireless device comprising:
wireless circuitry including one or more antennas;
one or more processors communicatively coupled to the wireless circuitry and to a memory storing instructions that, when executed by the one or more processors, cause the sending wireless device to perform a set of actions including:
receiving, from a receiving wireless device via a network-based server prior to initiation of a call connection to the receiving wireless device, information associated with a priority contact setting for the sending wireless device or a user thereof;
detecting initiation of the call connection to the receiving wireless device with a selected priority level;
sending, to a cellular wireless network, a request to establish a mobile-initiated call connection with the receiving wireless device;
obtaining an internet protocol (IP) address for the receiving wireless device;
establishing a parallel data connection between the sending wireless device and the receiving wireless device using the IP address; and
sending, to the receiving wireless device via the parallel data connection, an indication of the selected priority level for the request to establish the mobile-initiated call connection,
wherein:
options for priority level selection of the call connection are displayed at the sending wireless device prior to initiation of the call connection when the user of the sending wireless device is included as a priority contact in a configuration of the receiving wireless device; and
the selected priority level causes the receiving wireless device to override a silent or do not disturb setting to provide an incoming call connection notification alert with the selected priority level.

2. The sending wireless device of claim 1, wherein the IP address is obtained from a centralized server.

3. The sending wireless device of claim 2, wherein the centralized server comprises a push notification server managed by an original equipment manufacturer of the sending wireless device and the receiving wireless device.

4. The sending wireless device of claim 1, wherein the set of actions further comprise:
displaying, by the sending wireless device, the options for priority level selection of the call connection based on a configuration for priority notifications for a contact associated with the receiving wireless device and included in a contact list stored at the sending wireless device.

5. The sending wireless device of claim 4, wherein the configuration for priority notifications for the contact associated with the receiving wireless device is provided by the receiving wireless device via a network-based server.

6. The sending wireless device of claim 5, wherein the configuration for priority notifications for the contact associated with the receiving wireless device is based at least in part on a priority contact setting for the sending wireless device or an associated contact thereof maintained by the receiving wireless device.

7. The sending wireless device of claim 1, wherein the indication of the selected priority level is included in an extension header of a Session Initiation Protocol (SIP) invite message.

8. The sending wireless device of claim 1, wherein the incoming call connection notification alert comprises one or more of: an audible ringtone, a vibration pattern, or a visual alert indication.

9. The sending wireless device of claim 1, wherein the incoming call connection notification alert comprises one or more of the following selected by a user of the receiving wireless device: a particular audible ringtone, a particular vibration pattern, or a particular visual alert indication.

10. A receiving wireless device comprising:
wireless circuitry including one or more antennas;
one or more processors communicatively coupled to the wireless circuitry and to a memory storing instructions that, when executed by the one or more processors, cause the receiving wireless device to perform a set of actions including:
receiving an incoming call connection page from a sending wireless device via a cellular wireless network;
establishing a parallel data connection between the sending wireless device and the receiving wireless device;
receiving, from the sending wireless device via the parallel data connection, an indication of a priority level for the incoming call connection page;
overriding, based on a priority contact setting for the sending wireless device or a user thereof, a silent or do not disturb setting; and
providing an incoming call connection notification alert based on the priority level,
wherein information associated with the priority contact setting for the sending wireless device or the user thereof to allow display of options for priority level selection at the sending wireless device is provided to the sending wireless device before receipt of the incoming call connection page.

11. The receiving wireless device of claim 10, wherein the parallel data connection is established between the sending wireless device and the receiving wireless device based at least in part on assistance provided by a centralized server.

12. The receiving wireless device of claim 11, wherein the centralized server comprises a push notification server managed by an original equipment manufacturer of the sending wireless device and the receiving wireless device.

13. The receiving wireless device of claim 12, wherein the set of actions further comprise:
obtaining, via an input/output of the receiving wireless device, the priority contact setting for the sending wireless device or the user thereof.

14. The receiving wireless device of claim 13, wherein the priority contact setting establishes whether incoming call connection requests and/or messages received from the sending wireless device and having a particular indication of priority level can override the silent or do not disturb mode of the receiving wireless device.

15. The receiving wireless device of claim 10, wherein the information associated with the priority contact setting is provided via a network-based server to the sending wireless device.

16. The receiving wireless device of claim 10, wherein the information associated with the priority contact setting determines the options for priority level selection to be displayed at the sending wireless device when attempting to establish a connection with the receiving wireless device.

17. The receiving wireless device of claim 10, wherein the indication of the priority level is included in an extension header of a Session Initiation Protocol (SIP) invite message.

18. The receiving wireless device of claim 10, wherein the incoming call connection notification alert comprises one or more of: an audible ringtone, a vibration pattern, or a visual alert indication.

19. A method for providing a priority level indication with a call connection request to a receiving wireless device, the method comprising:
by a sending wireless device:
receiving, from the receiving wireless device via a network-based server prior to initiation of a call connection to the receiving wireless device, information associated with a priority contact setting for the sending wireless device or a user thereof;
detecting initiation of the call connection to the receiving wireless device with a selected priority level;
sending, to a cellular wireless network, a request to establish a mobile-initiated call connection with the receiving wireless device;
obtaining an internet protocol (IP) address for the receiving wireless device;
establishing a parallel data connection between the sending wireless device and the receiving wireless device using the IP address; and
sending, to the receiving wireless device via the parallel data connection, an indication of the selected priority level for the request to establish the mobile-initiated call connection,
wherein:
options for priority level selection of the call connection are displayed at the sending wireless device prior to initiation of the call connection when the user of the sending wireless device is included as a priority contact in a configuration of the receiving wireless device; and
the selected priority level causes the receiving wireless device to override a silent or do not disturb setting to provide an incoming call connection notification alert with the selected priority level.

20. The method of claim 19, further comprising:
displaying, by the sending wireless device, the options for priority level selection of the call connection based on a configuration for priority notifications for a contact associated with the receiving wireless device and included in a contact list stored at the sending wireless device.

* * * * *